Figure 1:
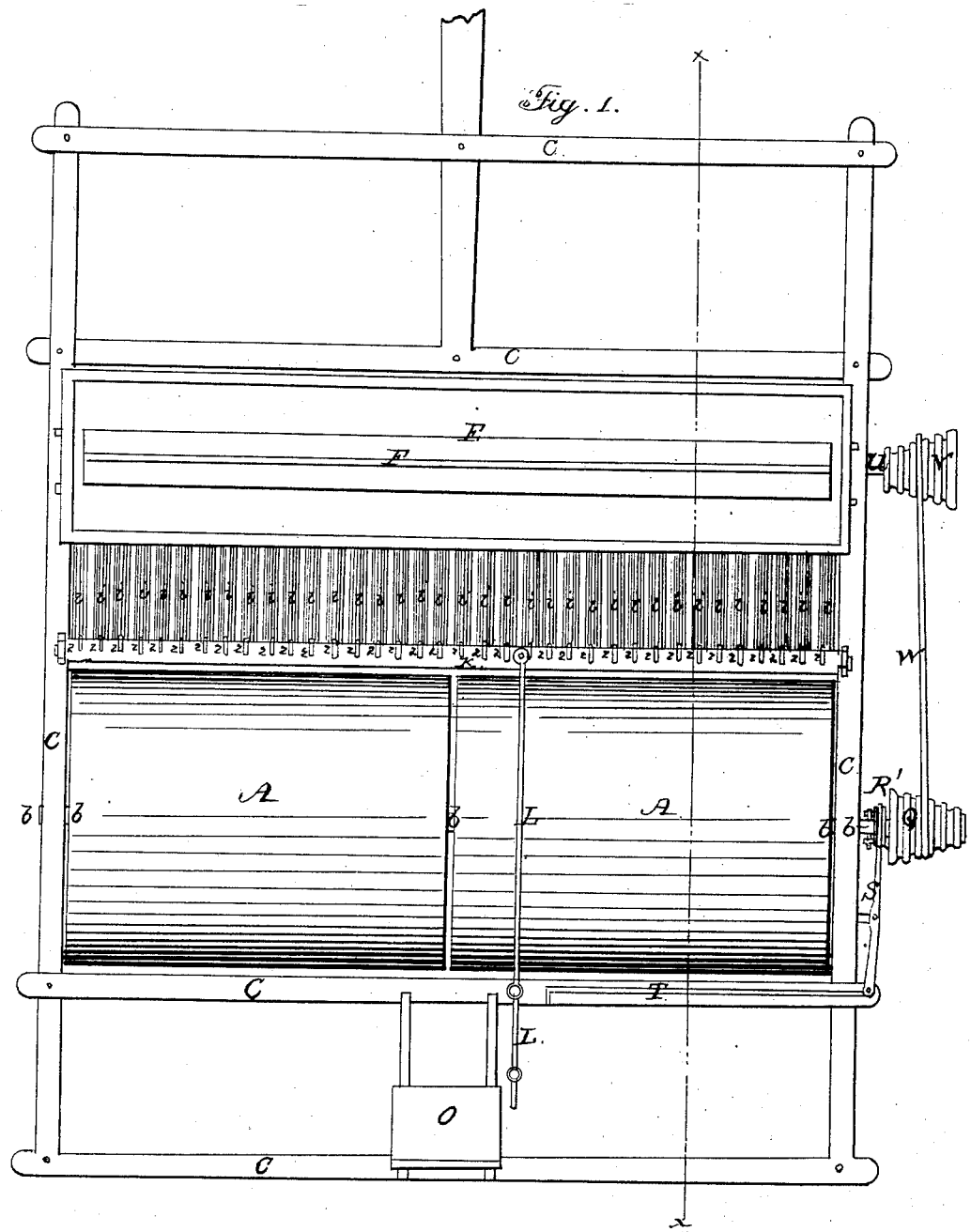

2 Sheets—Sheet 1.

A. G. BABCOCK.
Grain-Drill.

No. 21,807. Patented Oct. 19, 1858.

2 Sheets—Sheet 2.
A. G. BABCOCK.
Grain-Drill.
No. 21,807.  Patented Oct. 19, 1858.
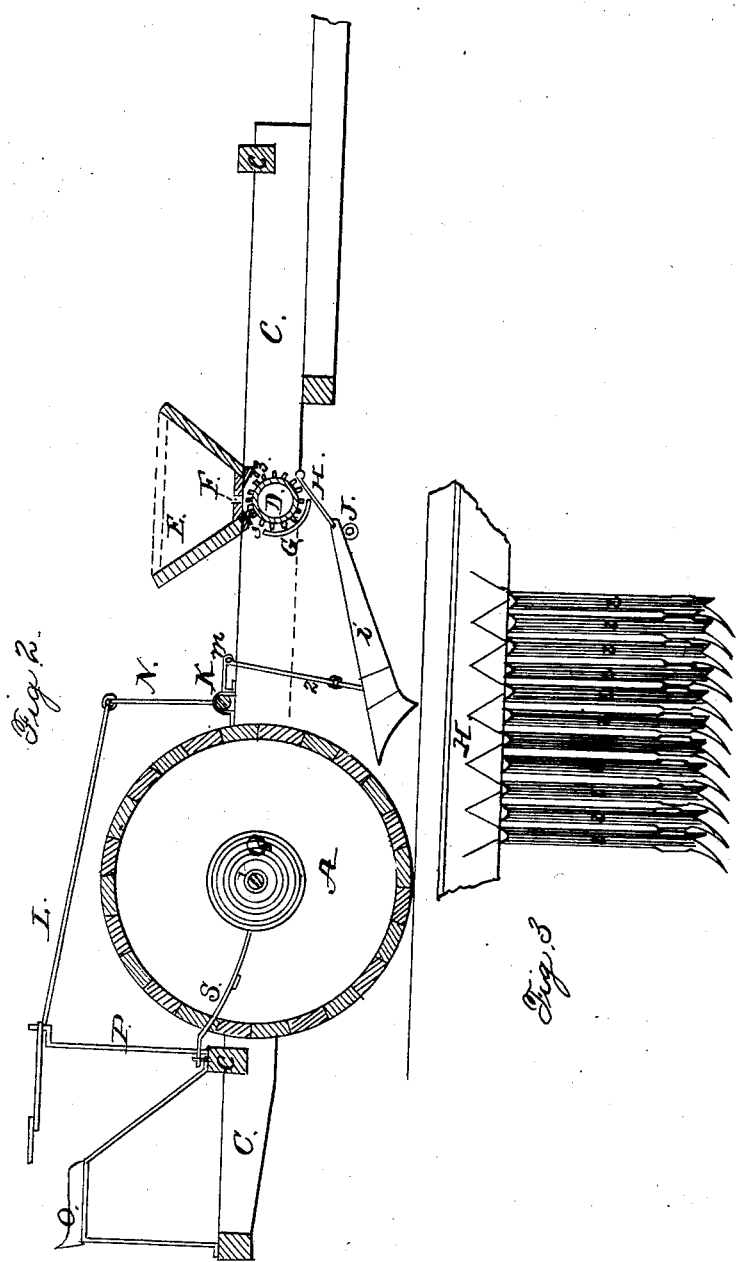

UNITED STATES PATENT OFFICE.

A. G. BABCOCK, OF GALESBURG, ILLINOIS.

IMPROVEMENT IN SEEDING-MACHINES.

Specification forming part of Letters Patent No. 21,807, dated October 19, 1858.

*To all whom it may concern:*

Be it known that I, A. G. BABCOCK, of Galesburg, in the county of Knox and State of Illinois, have invented a new and useful machine for sowing grain, either broadcast or in drills, also for dragging and rolling the ground, which I denominate a "Grain-Sower;" and I do hereby declare that the following is a full, clear, and exact description of the construction and operation of the same, reference being had to the annexed drawings, making a part of this specification, in which—

Figure 1 is a perspective view of the upper side; Fig. 2, a perspective view of the end and section through a line, $x\,x$; Fig. 3, a section of the guide-plate and drags.

The nature of my invention consists in the arrangement of two rollers placed on a center shaft, the right-hand roller being made fast to the shaft, on which is supported a frame composed of two side and four cross timbers. Forward of the rollers is placed a grooved cylinder of the same length as the rollers, extending across the frame and supported by it, and at a sufficient distance from the rollers to admit the drags. Immediately over it is placed a hopper, with an aperture in the bottom extending its whole length, through which the grain is discharged immediately into the grooves of the cylinder. Back of the cylinder is an apron, which extends partly round the cylinder and terminates at the most dependent point. Beneath the lower edge of the apron is placed a guide-plate, by which the grain is conveyed to certain points. Immediately below the back edge of the guide-plate, and underneath it, is placed a row of drags across the carriage and extending back toward the point where the rollers rest upon the ground. The upper or forward ends of the drags are attached to a rod extending across the carriage for that purpose. The drags are constructed with a cup or indentation at the upper end, continuing to the lower point by a trough or open top, into which the grain is received and conveyed to the ground. Near the lower end of the drags is attached a chain or connection extending up to a windlass placed directly over the place of attachment, with arms or levers extending forward, by which the lower ends of the drags are raised from the ground or lowered to it, as may be required in the operation of the machine. To the windlass is attached a lever with a rod extending back to the right of the driver's seat, by which the windlass is rotated and the drags raised or lowered at pleasure. The lever-rod of the windlass is made fast to a standard by a loop, holding the drags suspended when it is desired to move the machine without the drags resting upon the ground. Upon the end of the roller-shaft, at the right hand, is placed a sliding conical pulley with a fixture for moving it into or out of gear, the lever of which passes back, with a rod attached, passing to near the driver's seat, to be moved by the foot of the driver. The gudgeon of the grooved cylinder also extends to the right through and outside of the carriage, on which is also placed an inverted conical pulley, onto which and the pulley attached to the roller-shaft is placed a belt, so that when the rollers are in motion and the pulley on the roller-shaft in gear the grooved cylinder is made to revolve. When the belt is placed upon the pulleys straight and the machine is in motion the grooved cylinder revolves forward, emptying or scattering the grain from the grooves broadcast. The drags following and resting upon the ground harrow or drag the grain in, and the rollers necessarily level and press the ground. By crossing the belt between the two pulleys the grooved cylinder is made to revolve backward, when the grain is discharged within the apron, falling upon the upper edge of the guide-plate, from whence it is conducted to the cup and through the grooves of the drags to the ground, planting it in drills. The lower ends of the drags, where they rest upon the ground, are constructed with steel points, with a sharp cutting-edge downward to open a furrow or crevice for the reception of the grain, with a projection or landside on one side and an elongated projection turned out and over in the form of a mold-board on the other, for the purpose of turning the dirt and filling its neighbor's furrow or crevice. Underneath the hopper, and each side of the aperture, is placed a wiper, of leather, india-rubber, or other elastic substance, for the purpose of preventing the escape of any grain except what is contained in the grooves of the cylinder. Behind the rollers, and upon the back part of the frame, is fixed a driver's seat, on which the driver is able to manage the operations of the machine by lowering or raising the drags with the hands or putting the machine into or out of gear with the foot. The guide-plate is movable, and may be replaced by others, conveying the grain to different points, so as to pass through each drag, or every second, third, or fourth, &c., making the drill three, six, nine, or twelve inches apart, as the farmer may desire. By moving the belt to different points on the pulleys the grooved cylinder may be made to revolve fast or slow, discharging any desirable quantity of grain.

To enable others skilled in the art to make and use my invention, I will proceed to describe the same with reference to the drawings.

Through the rollers A A is a center shaft, $b$, to which the right-hand roller is made fast, and on which is supported a frame, C, composed of two side and four cross timbers. Forward of the rollers is placed a grooved cylinder, D, Fig. 2, extending across the frame and supported by it, of the same length as the rollers, and at a sufficient distance from them to admit the drags $i$. Immediately over is placed a hopper, E, with an aperture, F, through which the grain is discharged immediately into the grooves of the cylinder D, Fig. 2. Back of the cylinder is an apron, G, which extends partly round the cylinder, and terminates at the most dependent point. Beneath the lower edge of the apron is placed a guide-plate, H, by which the grain is conveyed to certain points.

Immediately below the back and lower edge of the guide-plate H, and underneath it, is placed a row of drags, $i$, across the carriage and extending back toward the point where the rollers rest upon the ground. The upper or forward ends of the drags are attached to a rod, J, extending across the carriage for that purpose. The drags $i$ are constructed with a cup or indentation at the upper end, which is continued to the lower point by a trough or open top, into which the grain is received and conveyed to the ground. Near the lower end of the drags $i$ is attached a chain or connection, 2, extending up to a windlass, K, placed directly over the point of attachment, with arms or levers $m$ 2 extending forward, by which the lower ends of the drags $i$ are raised from the ground or lowered to it, as may be required in the operation of the machine. To the windlass is attached a lever, N, Fig. 2, with a rod, L, extending back to the right of the driver's seat O, by which the windlass K is rotated and the drags lowered or raised at pleasure. The lever-rod L of the windlass is made fast to a standard, P, Fig. 2, by a loop holding the drags suspended when it is desired to move the machine without the drags resting the ground. Upon the end of the roller-shaft $b$, at the right hand, is placed a sliding conical pulley, Q, with a fixture, R, Fig. 1, for moving it into or out of gear, the lever S of which passes back, with a rod, T, attached, passing to near the driver's seat O, to be moved by the foot of the driver.

The gudgeon U of the grooved cylinder D also extends to the right through and outside of the carriage, on which is also placed an inverted conical pulley, V, onto which and the pulley Q, attached to the roller-shaft $b$, is placed a belt, W, so that when the rollers A A are in motion and the pulley Q on the roller-shaft $b$ is in gear the grooved cylinder D is made to revolve. When the belt is placed upon the pulleys straight and the machine is in motion the grooved cylinder D revolves forward, emptying or scattering the grain from the grooves broadcast. The drags $i$, following and resting upon the ground, harrow or drag the grain in, and the rollers A A, following, necessarily level and press the ground. By crossing the belt W between the pulleys the grooved cylinder D is made to revolve backward, when the grain is discharged within the apron G, falling upon the upper edge of the guide-plate H, from whence it is conducted to the cups and through the grooves of the drags $i$ to the ground, planting it in drills. The lower ends of the drags $i$, where they rest upon the ground, are constructed with steel points, with a sharp cutting-edge downward, to open a furrow or crevice for the reception of the grain, with a projection or landside on one side and an elongated projection turned out and over in the form of a mold-board on the other, for the purpose of turning the dirt and filling its neighbor's furrow or crevice.

Underneath the hopper E, and on each side of the aperture F, is placed a wiper, 3, Fig. 2, of leather, india-rubber, or other elastic substance, for the purpose of preventing the escape of any grain except what is contained in the grooves of the cylinder.

Behind the rollers A A, and upon the back part of the frame, is fixed a driver's seat, O, on which the driver is able to manage the operation of the machine by lowering or raising the drags with the hands or putting the machine into or out of gear with the foot.

The guide-plate H is movable, and may be replaced by others conveying the grain to different points, so as to pass through each drag, or every second, third, or fourth, &c., making the drills three, six, nine, or twelve inches apart, as the farmer may desire.

By moving the belt at different points on the pulleys the grooved cylinder may be made to revolve fast or slow, discharging any desirable quantity of grain.

Having thus fully described my invention, what I claim as new therein, and desire to secure by Letters Patent, is—

The within-described arrangement of the farm-rollers A A, grooved cylinder D, elastic wipers 3, hopper E, guide-plate H, drags $i$, and windlass K, when constructed as and for the purpose set forth.

A. G. BABCOCK.

Witnesses:
ASAPH N. CARPENTER,
LEO G. BABCOCK.